United States Patent [19]

Uchinami et al.

[11] Patent Number: 5,035,220
[45] Date of Patent: Jul. 30, 1991

[54] FUEL CONTROLLER FOR AN INTERNAL COMBUSTION ENGINE

[75] Inventors: Masanobu Uchinami; Toshihisa Takahashi, both of Himeji, Japan

[73] Assignee: Mitsubishi Denki K.K., Tokyo, Japan

[21] Appl. No.: 381,919

[22] Filed: Jul. 19, 1989

[30] Foreign Application Priority Data

Jul. 20, 1988 [JP] Japan .................. 63-181117
Jul. 20, 1988 [JP] Japan .................. 63-181118

[51] Int. Cl.⁵ .......................................... F02D 41/26
[52] U.S. Cl. .................... 123/436; 123/481
[58] Field of Search ........ 123/198 D, 198 DB, 198 F, 123/419, 436, 479, 481; 73/116, 117.3; 60/277, 285

[56] References Cited

U.S. PATENT DOCUMENTS

| | | | |
|---|---|---|---|
| 3,916,622 | 11/1975 | Gospodar | 123/198 F X |
| 3,972,230 | 8/1976 | Hanson et al. | 73/116 |
| 4,015,428 | 4/1977 | Kawai | 123/198 F X |
| 4,023,358 | 5/1977 | Maurer et al. | 123/198 F X |
| 4,024,850 | 5/1977 | Peter et al. | 123/198 F |
| 4,104,990 | 8/1978 | Frobenius | 123/436 |
| 4,366,793 | 1/1983 | Coles | 123/436 |
| 4,366,794 | 1/1983 | Hachiga et al. | 123/479 |
| 4,372,269 | 2/1983 | Coles | 123/436 |

FOREIGN PATENT DOCUMENTS

| | | | |
|---|---|---|---|
| 187739 | 9/1985 | Japan | 123/436 |
| 263241 | 10/1988 | Japan | 123/481 |
| 295838 | 12/1988 | Japan | 123/481 |

*Primary Examiner*—Tony M. Argenbright
*Attorney, Agent, or Firm*—Sughrue, Mion, Zinn, Macpeak & Seas

[57] ABSTRACT

A fuel controller for an internal combustion engine has a misfiring sensor which can detect when misfiring occurs in an engine cylinder. When misfiring is detected, the fuel injector corresponding to the misfiring cylinder is prevented from supplying fuel to the misfiring cylinder, while the fuel injectors for the other cylinders continue to operate normally. The fuel injector for the misfiring cylinder can be disabled by a switching circuit which turns off a power amplifier for driving the fuel injector. Misfiring can be detected by sensing changes in the rotational speed of the engine between prescribed crankshaft angles due to a reduction in torque when misfiring occurs.

7 Claims, 7 Drawing Sheets

FUEL CONTROLLER FOR AN INTERNAL COMBUSTION ENGINE

BACKGROUND OF THE INVENTION

This invention relates to a fuel controller for an internal combustion engine. More particularly, it relates to a fuel controller which can stop the supply of fuel to an individual cylinder which is misfiring.

Electronic fuel injection systems for internal combustion engines of automobiles are becoming increasingly common. In these systems, an optimal air-fuel ratio is calculated by a microprocessor on the basis of various operating parameters such as the engine speed, the air intake rate, the air intake temperature, and the engine temperature. Electromagnetically-operated fuel injectors are then controlled so as to achieve an air-fuel mixture having the optimal air-fuel ratio.

Many automobiles are equipped with a catalytic converter for removing harmful components from the engine exhaust gases. A typical catalytic converter is a three-way catalytic converter which simultaneously oxidizes carbon monoxide and hydrocarbons while it reduces oxides of nitrogen (NOx). An electronic fuel injection system is usually designed to maintain the air-fuel ratio near the stoichiometric ratio so that the catalytic converter can function effectively.

Occasionally, due to breakage of parts, poor electrical connections, or equipment malfunctions, combustion does not take place properly in one or more cylinders of an engine and so-called "misfiring" occurs. Due to misfiring, a mixture of uncombusted fuel and air flows into the catalytic converter, and a sudden chemical reaction takes place, causing an enormous increase in the temperature of the catalytic converter. Under these conditions, the catalytic converter can not function properly, and harmful exhaust components are discharged into the atmosphere. The increase in temperature also produces degradation of the catalytic converter and shortens its life span. Furthermore, when the automobile is stationary, if dead grass or other combustible material should contact the catalytic converter when it is at an abnormally high temperature due to misfiring, there is the possibility of a fire starting.

To prevent such problems, various devices have been proposed for detecting misfiring and stopping the supply of fuel to an engine when misfiring takes place. For example, Japanese Published Unexamined Patent Application No. 63-63933 discloses an apparatus which detects misfiring by measuring the pressure inside the cylinders of an internal combustion engine. When it is determined that misfiring has occurred in a cylinder, the supply of fuel to all the fuel injectors of the engine is stopped.

U.S. Pat. No. 4,366,794 discloses a fuel injection control method in which misfiring is detected by comparing the voltage of the primary coil of an engine ignition coil with a predetermined value. If misfiring is detected, fuel injection is stopped by reducing the fuel injection quantity to zero.

However, in these and other conventional systems, even if only a single cylinder of the engine is misfiring, the fuel supply for all the cylinders is stopped, thereby stopping the engine. Therefore, the vehicle must be towed to a repair shop, even though the cylinders which were functioning normally were sufficient to enable the vehicle to run under its own power to the repair shop.

SUMMARY OF THE INVENTION

Accordingly, it is an object of the present invention to provide a fuel controller for an internal combustion engine which can detect misfiring of an individual cylinder of the engine and stop the supply of fuel to that cylinder while allowing the remaining cylinders to function normally.

It is another object of the present invention to provide a fuel controller for an internal combustion engine which can detect misfiring on the basis of the rotational speed of the engine.

A fuel controller for an internal combustion engine in accordance with the present invention is equipped with a misfiring sensing means which detects when a cylinder of the engine misfires. A fuel supply cut-off means is provided which prevents the fuel injector for a misfiring cylinder from supplying fuel to the misfiring cylinder while allowing the fuel injectors for the remaining cylinders to operate normally.

The misfiring sensing means can be any device which can detect the misfiring of an individual cylinder of an engine. In one preferred embodiment, the misfiring sensor is a device which determines whether misfiring is taking place based on the pressure in each cylinder during the power stroke.

In another preferred embodiment, the misfiring sensing means is a device which measures the change in rotational speed of the engine between prescribed crankshaft angles. The misfiring sensing means determines that misfiring is occurring when the decrease in the rotational speed or the percent decrease in the rotational speed is more than a prescribed quantity, indicating a drop in torque due to misfiring.

Various means can be used for cutting off the supply of fuel to a misfiring cylinder. In one preferred embodiment, each of the fuel injectors is driven by a power amplifier, and the means for preventing injection comprises switching circuits which are connected to the power amplifiers. When one of the switching circuits is operated, the power amplifier to which it is connected is turned off, and the corresponding fuel injector can not be driven. The switching circuits are individually controlled by a microprocessor so that the fuel supply for a misfiring cylinder can be stopped without affecting the supply of fuel for the remaining cylinders.

In another preferred embodiment, the fuel injector of a misfiring cylinder is prevented from supplying fuel to the cylinder by a CPU which controls the counter for supplying an injection pulse to the fuel injector.

The present invention can be applied to various fuel injection systems, including those which perform continuous fuel injection, those which perform sequential fuel injection, and those in which the fuel injectors are operated in groups.

DESCRIPTION OF THE PREFERRED EMBODIMENTS

Figure 1:
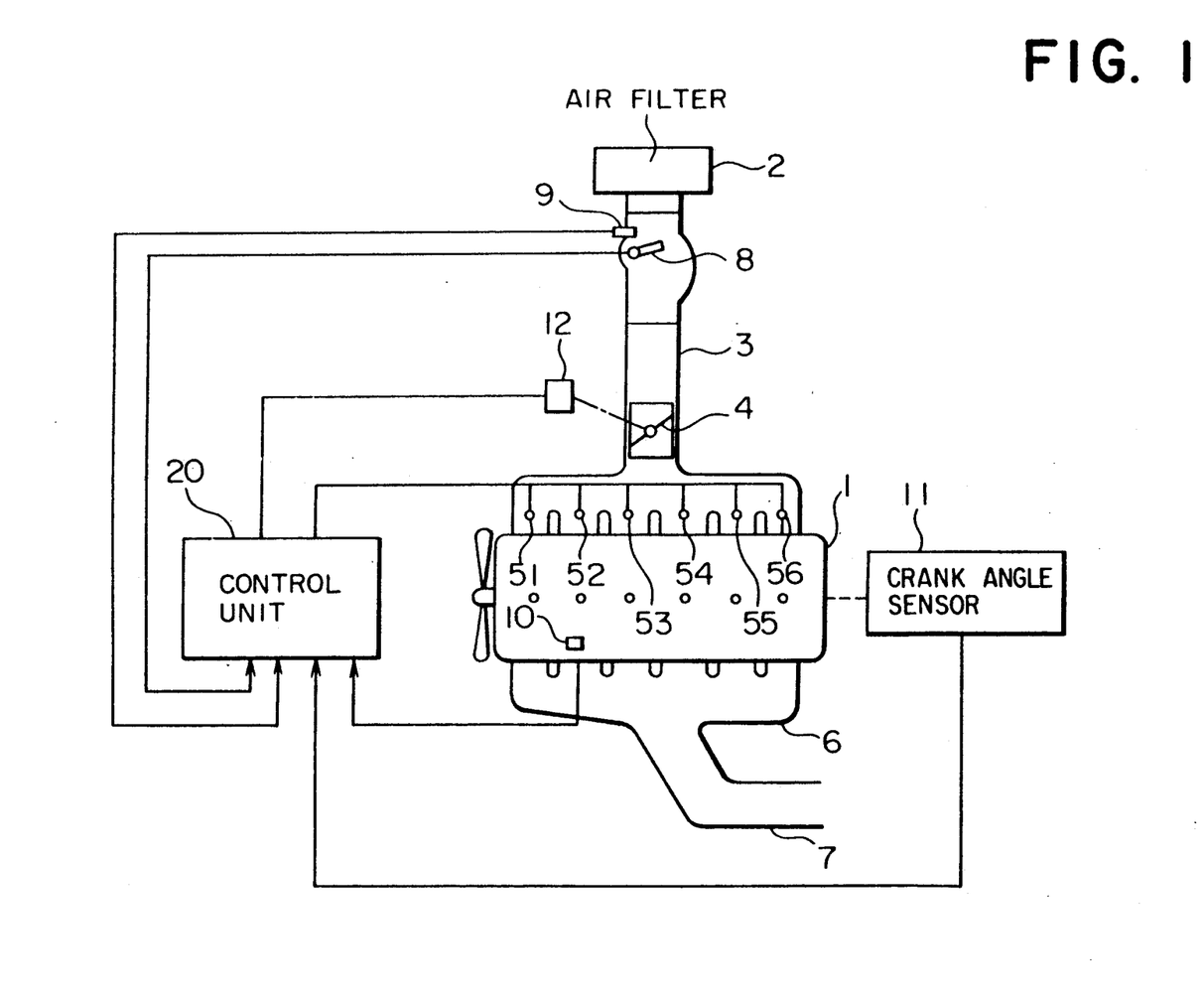
FIG. 1 is a schematic illustration of a fuel controller in accordance with the present invention as applied to a six-cylinder engine.

A number of preferred embodiments of a fuel controller in accordance with the present invention will now be described while referring to the accompanying drawings. FIG. 1 is a schematic illustration of a fuel controller of the present invention as applied to a four-stroke, spark ignition automobile engine 1. The illustrated engine 1 is equipped with six cylinders, but the number of cylinders is not critical and the present invention can be applied to an engine having any number of cylinders.

As shown in FIG. 1, the engine 1 has an air intake pipe 3 which is connected to six cylinders. An air filter 2 is mounted on the entrance of the air intake pipe 3, and a throttle valve 4 is rotatably mounted inside the air intake pipe 3. Six electromagnetically-operated fuel injectors 51–56 are installed on the engine 1, each of the injectors being associated with one of the six cylinders. The fuel injectors are driven by a control unit 20. Exhaust gas is discharged from the engine 1 via an exhaust manifold 6 and an exhaust pipe 7.

An air intake sensor 8 which senses the rate of air intake into the engine is mounted in the air intake pipe 3. It generates an analog voltage corresponding to the air intake rate and inputs the voltage to the control unit 20.

A thermistor-type air temperature sensor 9 which senses the temperature of the intake air is also mounted on the air intake pipe 3. It generates an analog voltage corresponding to the intake air temperature and provides the voltage to the control unit 20.

A thermistor-type water temperature sensor 10 is mounted on the engine 1. It senses the cooling water temperature and generates a corresponding analog voltage which it supplies to the control unit 20. A crank angle sensor 11 generates output pulses at prescribed crankshaft angles of the engine 1 and supplies the pulses to the control unit 20. In a six-cylinder engine, the crank angle sensor 11 typically generates an output pulse for every 120 degrees of crankshaft rotation.

An idle switch 12 which senses when the opening of the throttle valve 4 is less than a prescribed amount is installed on the throttle valve 4. It generates an output signal which is provided to the control unit 20.

Based on the output signals from the air intake sensor 8, the intake air temperature sensor 9, the water temperature sensor 10, the crank angle sensor 11, and the idle switch 12, the control unit 20 calculates the appropriate amount of fuel to be supplied to the engine 1 and controls the operation of the fuel injectors 51–56 so as to supply this amount.

Figure 2:
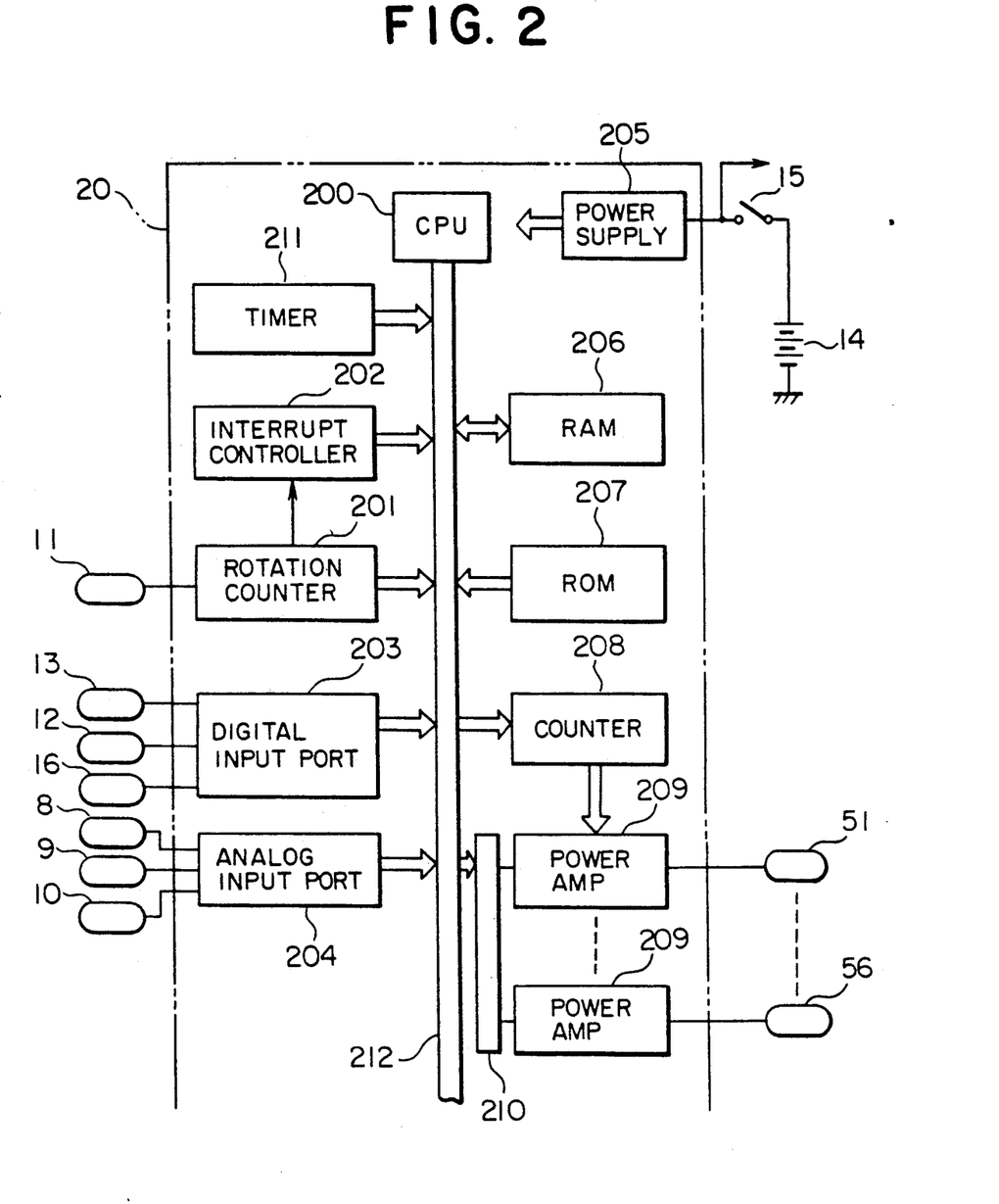
FIG. 2 is a block diagram of a first embodiment of the control unit of FIG. 1.

FIG. 2 illustrates a first embodiment of the control unit 20 of FIG. 1. The operation of the control unit 20 is controlled by a microprocessor 200, which will be referred to as a CPU. A rotation counter 201 which is connected to the crank angle sensor 11 generates an output signal corresponding to the period between successive output pulses of the crank angle sensor 11. It also sends an interrupt signal to an interrupt controller 202 in synchrony with the engine rotations. Upon receiving the interrupt signal, the interrupt controller 202 provides an interrupt signal to the CPU 200 via a bus 212. In response to the interrupt signal, the CPU 200 executes an interrupt handling routine and calculates the amount of fuel to be supplied to the engine 1.

A digital input port 203 transmits digital signals to the CPU 200, such as signals from the idle switch 12 and a starter signal from a starter switch 13 which turns an unillustrated starter on and off. The digital input port 203 also receives an input signal from an unillustrated misfiring sensor 16. The misfiring sensor 16 can detect the occurrence of misfiring in each cylinder of the engine and constitutes misfiring sensing means. Any type of misfiring sensor 16 can be employed, such as the sensor disclosed in Japanese Published Unexamined Patent Application No. 63-63993, which detects misfiring on the basis of the pressure in each cylinder during the power stroke.

An analog input port 204 includes an analog multiplexer and an A/D converter. The A/D converter performs A/D conversion of signals from the air intake sensor 8, the air temperature sensor 9, and the cooling water temperature sensor 10 and provides the resulting digital signals in sequence to the CPU 200.

The output signals from the rotation counter 201, the interrupt controller 202, the digital input port 203, and the analog input port 204 are transmitted to the CPU 200 via the bus 212.

A battery 14 supplies power to the CPU 200 via a key switch 15 and a power supply circuit 205.

A RAM 206 and a ROM 207 are connected to the CPU 200 by the bus 212. The RAM 206 is used for temporary data storage, and the ROM 207 stores a program to be executed by the CPU 200 and various constants.

The duration of each fuel injection by the fuel injectors 51–56 is controlled by a counter 208 in the form of a down counter equipped with a register. The counter 208 receives a signal from the CPU 200 indicating the amount of fuel to be injected and converts the signal into a pulse having a width which determines the duration of fuel injection for each fuel injector.

The output signal of the counter 208 is provided to six power amplifiers 209 which serve as drivers for the fuel injectors. Each of the amplifiers 209 is connected to a different one of the fuel injectors 51–56. All six amplifiers 209 are controlled by the same counter 208.

Each of the amplifiers 209 can be enabled or disabled by a corresponding amplifier switching circuit 210 which is connected between the amplifier 209 and the bus 212. Based on a signal from the CPU 200, each switching circuit 210 can turn off the amplifier 209 to which it is connected and prevent the operation of the corresponding fuel injector.

Figure 3:
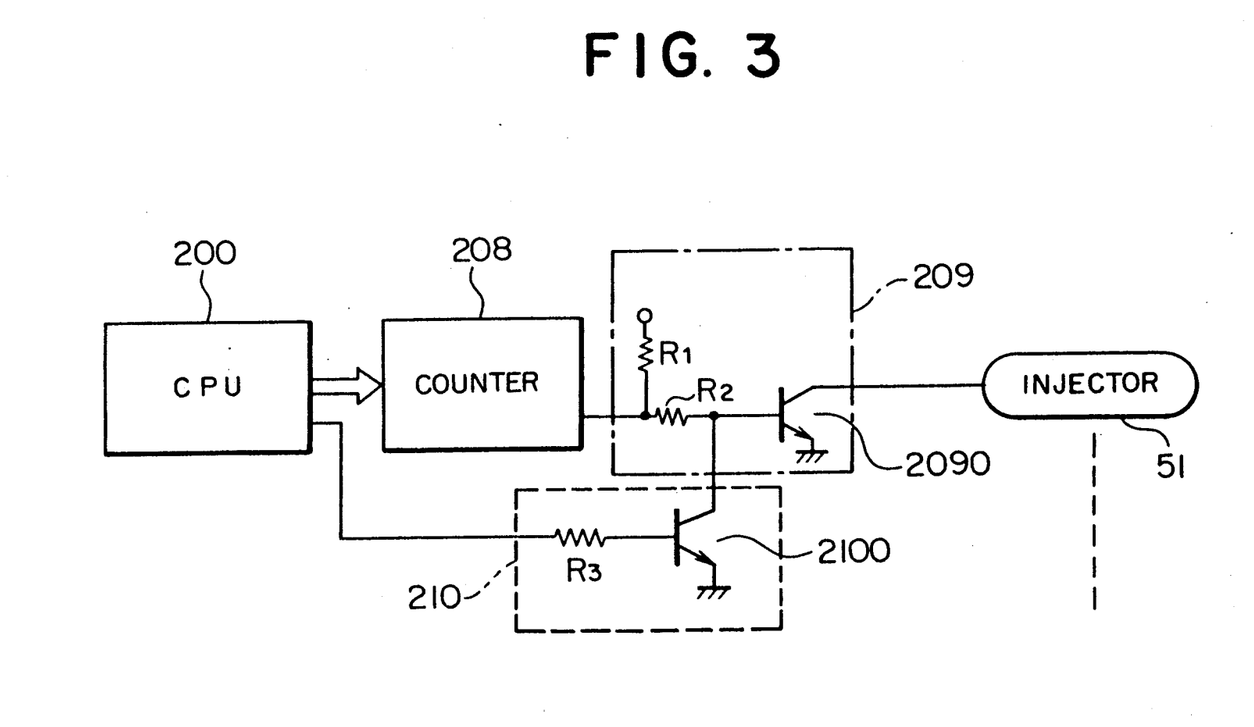
FIG. 3 is a schematic diagram of an example of the amplifier switching circuit of FIG. 2.

FIG. 3 illustrates an example of an amplifier 209 and its switching circuit 210. In this example, each amplifier 209 includes a transistor 2090 whose base is connected to a power supply through series resistors R1 and R2. The output of the counter 208 is applied to the junction of resistors R1 and R2. The collector of the transistor 2090 is connected to one of the fuel injectors, and its emitter is connected to ground. The switching circuit 210 comprises a transistor 2100 and a resistor R3. The base of the transistor 2100 is connected to the CPU 200 via the resistor R3, its collector is connected to the base of transistor 2090, and its emitter is grounded. With this structure, by controlling the voltage applied to the base of transistor 2100, the amplifier 209 can be switched on and off by the CPU 200. If transistor 2100 is turned on by the CPU 200, transistor 2090 can not supply current to the corresponding fuel injector and the fuel injector can not supply fuel, regardless of the output of the counter 208. The switching circuit 210 constitutes fuel supply cut-off means for preventing the operation of the fuel injector of a misfiring cylinder.

A timer 211 generates a signal when a prescribed length of time has elapsed and provides the signal to the CPU 200.

Figure 4A:
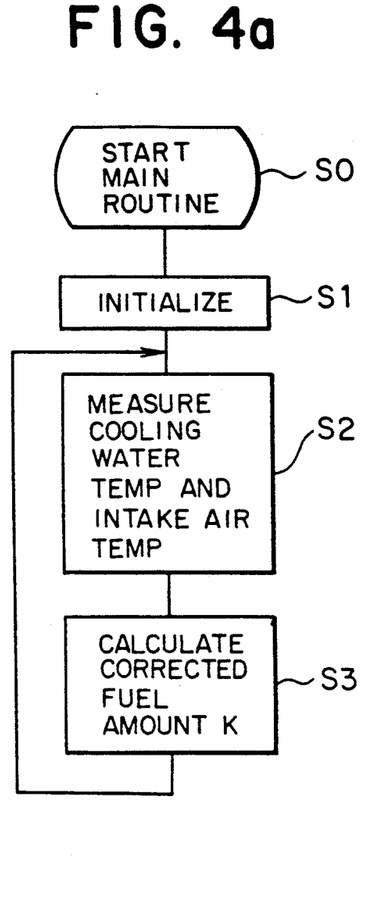
FIG. 4a is a flow chart of the main routine and FIG. 4b is a flow chart of an interrupt handling routine executed by the CPU of FIG. 2.

FIG. 4a is a flow chart of the main program executed by the CPU 200. The operation of the embodiment of FIG. 2 will now be described while referring to this flow chart.

If the key switch 15 and the starter switch 13 are turned on to start the engine 1, in Step S0, the CPU begins processing. In Step S1, initialization takes places. In Step S2, digital values corresponding to the cooling water temperature and the intake air temperature are read into the CPU 200 from the analog input port 204. In Step S3, the fuel injection correction K is calculated based on the measured temperatures, and the result is stored in the RAM 206. At the completion of Step S3, the program returns to Step S2. The CPU 200 normally repeats Steps S2 and S3 in accordance with a control program.

Figure 4B:
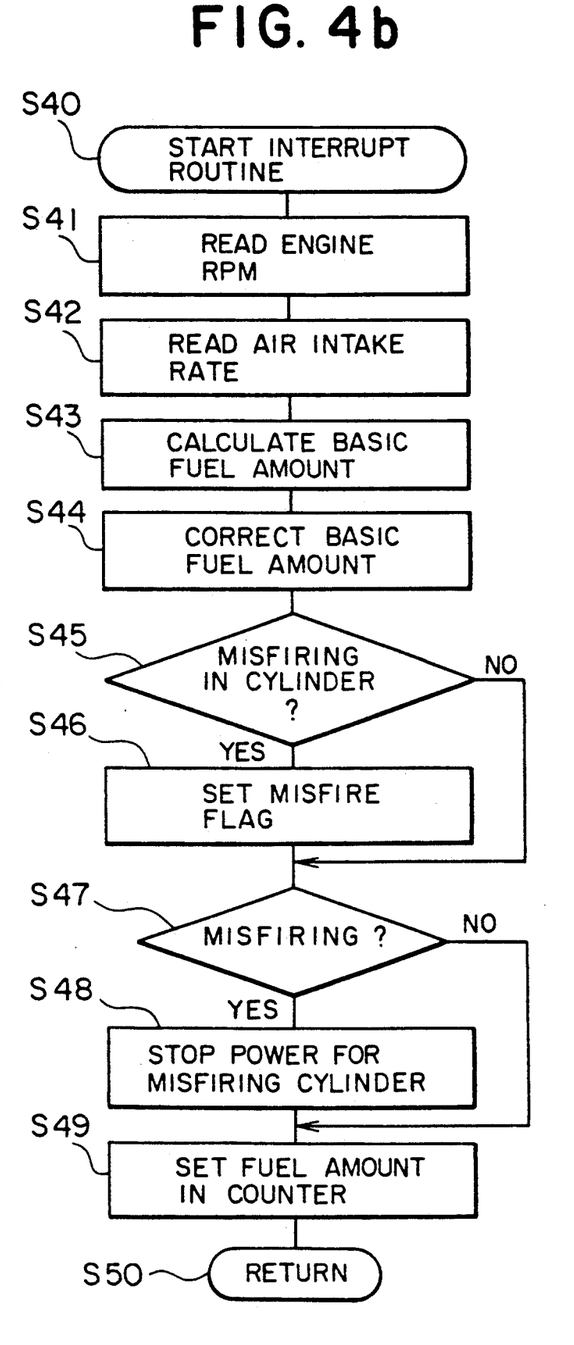

When an interrupt signal is input from the interrupt controller 202, the CPU 200 immediately interrupts its processing, even if it is in the middle of the main routine, and transfers to Step S40 of an interrupt handling routine, a flow chart of which is illustrated in FIG. 4b.

First, in Step S41, a signal which indicates the period between successive output pulses of the crank angle sensor 11 is input from the rotation counter 201, and the CPU 200 calculates the engine rotational speed using the formula Rotational Speed = $X$/Period between Pulses wherein X is a constant. In Step S42, a signal indicating the air intake rate is input from the analog input port 204. In Step S43, a basic fuel injection amount is calculated based on the engine rotational speed, the air intake rate, and prescribed constants.

In Step S44, the fuel injection correction K is read from the RAM 206, and the basic fuel injection amount is corrected in accordance with the fuel injection correction K.

In Step S45, based on the output from the misfiring sensor 16, it is determined whether the cylinder which is presently performing its power stroke has misfired. If misfiring has occurred, then the routine proceeds to Step S46, and a flag indicating the misfiring of a prescribed cylinder is set. If no misfiring is detected in Step S45, then the routine proceeds directly to Step S47.

In Step S47, it is checked whether a misfiring flag is set. If one of the misfiring flags is set, then the amplifier switching circuit 210 for the fuel injector of the cylinder which misfired, as indicated by the misfiring flag, is turned on. Namely, transistor 2100 is turned on, the base of transistor 2090 is lowered to ground potential, and the power amplifier 209 is made inoperable. As a result, the fuel injector to which it is connected is prevented from operating.

In Step S48, a signal corresponding to the amount of fuel to be injected into the cylinders is set in counter 208, and the counter 208 generates an output pulse having a pulse width corresponding to the amount of fuel to be injected. This pulse is supplied to all of the power amplifiers 209, and the fuel injectors for all the cylinders which have not misfired are operated.

In Step S47, if it is determined that none of the misfiring flags are set, then the routine proceeds to Step S49, and all the fuel injectors are operated. In Step S50, a return is performed to the main program.

Thus, in accordance with the above-described embodiment, as soon as it is determined that a specific cylinder has misfired, the power amplifier for the fuel injector of only that cylinder is switched off while the fuel injectors for the remaining cylinders continue to function normally. Therefore, the engine can continue to operate on the remaining cylinders. As no fuel is supplied to the cylinder which misfired, uncombusted fuel can not reach the catalytic converter. Accordingly, the catalytic converter can be prevented from overheating, so it is not degraded, harmful gases are not discharged from the catalytic converter, and there is no danger of fires being caused.

Figure 5:
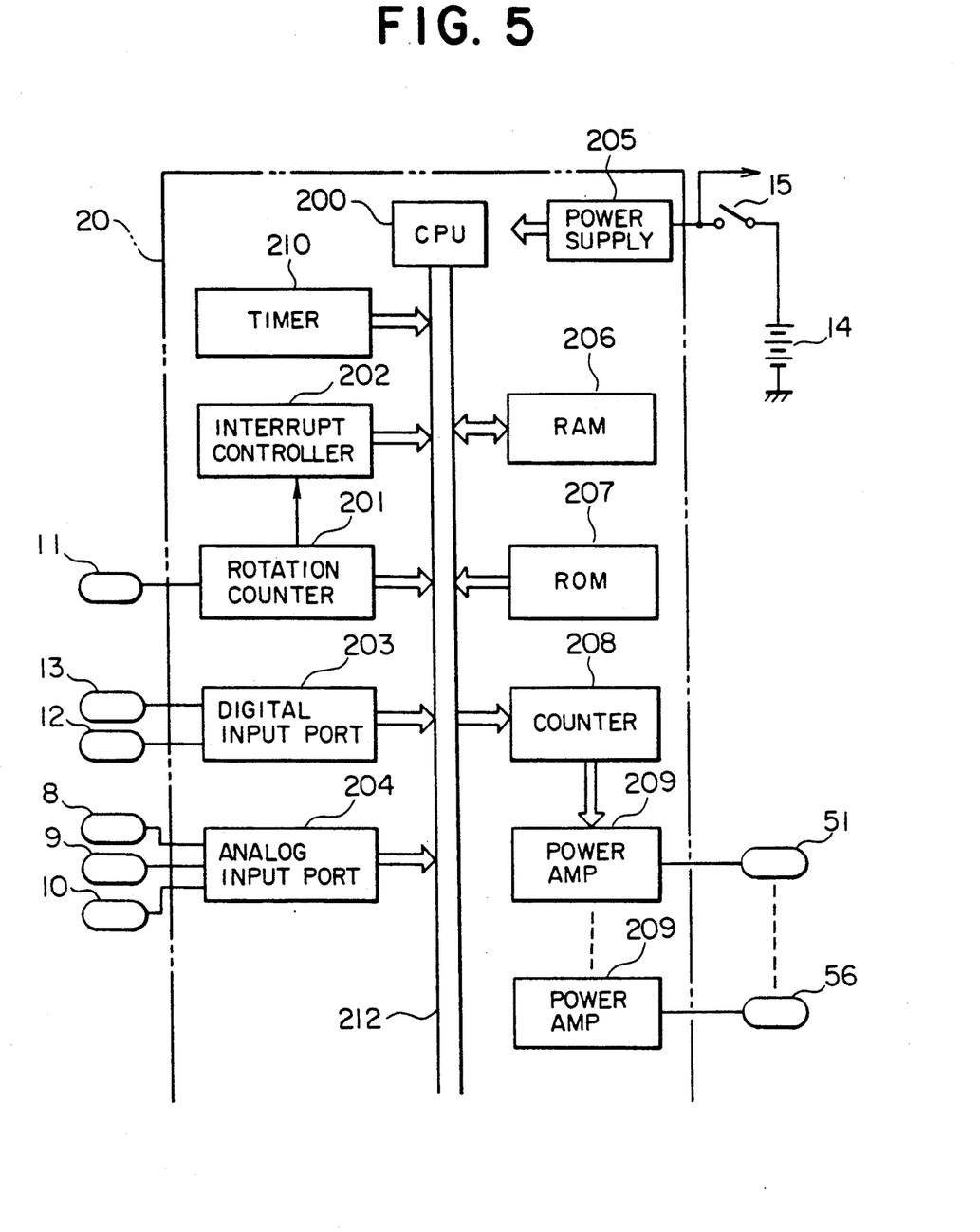
FIG. 5 is a block diagram of a second embodiment of the control unit of FIG. 1.

The embodiment illustrated in FIG. 2 employs a conventional misfiring sensor 16 which detects misfiring on the basis of the pressure inside a cylinder during the power stroke. FIG. 5 illustrates a second embodiment of a control unit for a fuel controller according to the present invention in which misfiring is detected on the basis of changes in the rotational speed of the engine when misfiring occurs, as indicated by the output of the rotation counter 201. This embodiment is not equipped with a misfiring detector 16 or amplifier switching circuits, 210, but its structure is otherwise the same as that of the embodiment of FIG 2.

Figure 6:
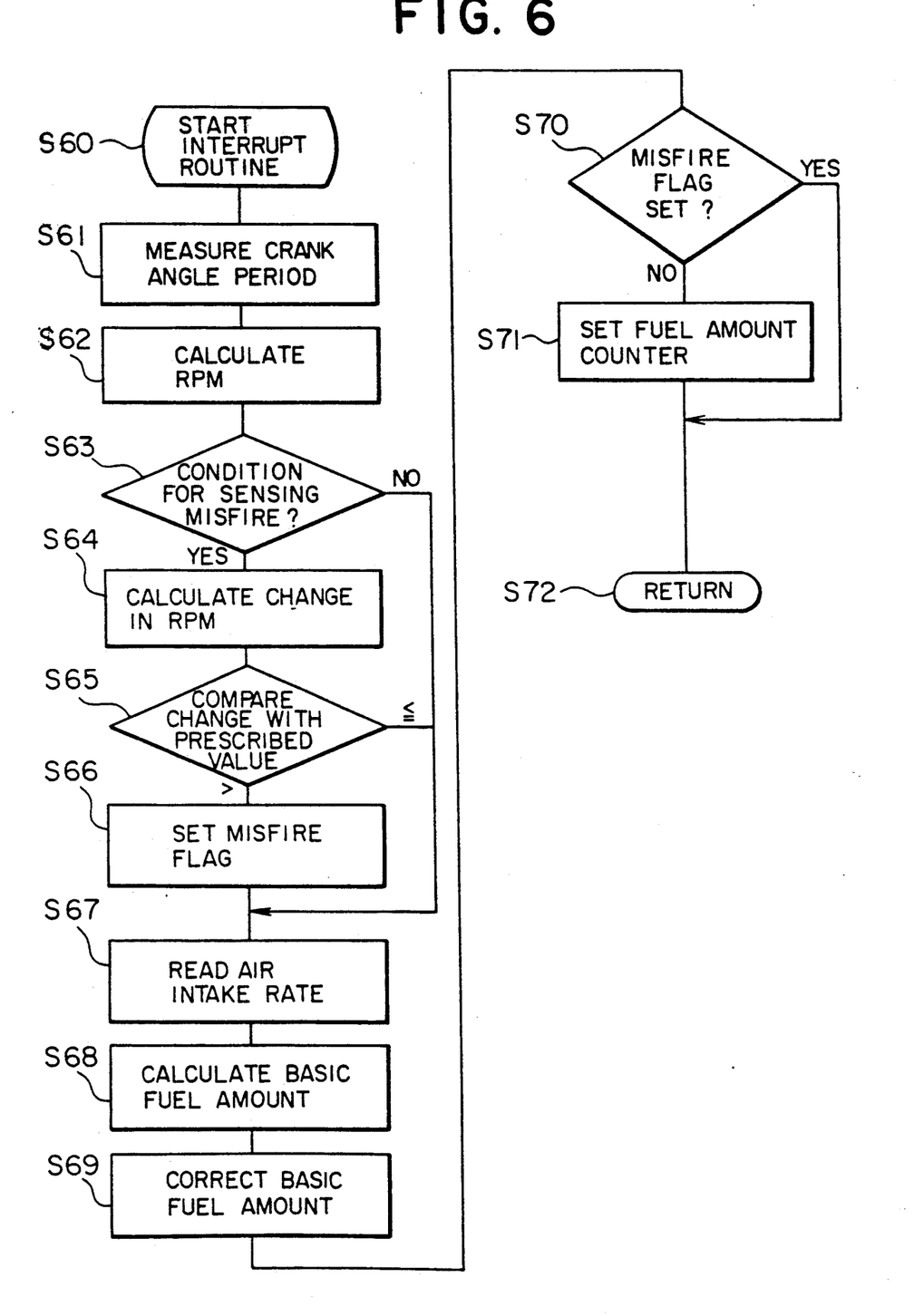
FIG. 6 is a block diagram of an interrupt handling routine executed by the CPU of FIG. 5.

The main program executed by the CPU 200 of FIG. 5 is the same as that illustrated in FIG. 4a. The operation of this embodiment differs from that of the embodiment of FIG. 2 with respect to an interrupt handling routine which is performed by the CPU 200 whenever there is an interrupt request from the interrupt controller 202. A flow chart of this interrupt handling routine is illustrated in FIG. 6.

In Step S60, the interrupt handling routine is entered from the main program. In Step S61, a signal corresponding to the period between prescribed crankshaft angles is input from the rotation counter 201. In the present embodiment, the crank angle sensor 11 generates an output pulse once every 120 degrees of crankshaft rotation, so the signal from the rotation counter 201 indicates the period for the crankshaft to rotate by 120 degrees. In Step S62, based on the measured period, the rotational speed is calculated by the formula Rotational Speed = $X$/ Period between Output Pulses wherein X is a constant. The rotational speed is then stored in the RAM 206.

Next, in Step 63, it is determined whether the engine operating conditions are such that misfiring detection should be performed. Generally, in this embodiment, misfiring detection is performed only when the engine is running at a steady state, or when it is idling and the transmission is in neutral. A steady state can be detected by a device which senses acceleration based on changes in the air intake rate. It can be determined whether the engine is idling based on the output signal from the idle switch 12, and it can be determined whether the engine is in neutral based on the output signal from an unillustrated neutral switch or a speed sensor. Devices for detecting a steady state, engine idling, and neutral are well known to those skilled in the art and a detailed explanation of their structure and operation will be omitted.

If it is determined in Step S63 that the engine conditions are suitable for detecting misfiring, then the routine proceeds to Step S64. If it is determined in Step S63 that misfiring detection should not be performed, then the routine proceeds to Step S67.

In Step S64, the change between the previous rotational speed (which was stored in the RAM 206 in Step S62 the previous time that the interrupt handling routine was executed) and the present rotational speed (which was just stored in the RAM 206) is calculated. In Step S45, the difference in rotational speeds is compared with a reference value.

If the absolute value of the change in rotational speed is greater than the reference value and the rotational speed has decreased, then it is determined that misfiring has occurred. In Step S66, a misfiring flag corresponding to the cylinder which is now performing its power stroke is set.

On the other hand, if the absolute value of the change in rotational speed is less than or equal to the reference value, or if the absolute value of the change is larger than the reference value but the engine speed has increased, then it is determined that the cylinder is not misfiring, and the routine proceeds to Step S67.

Figure 7:
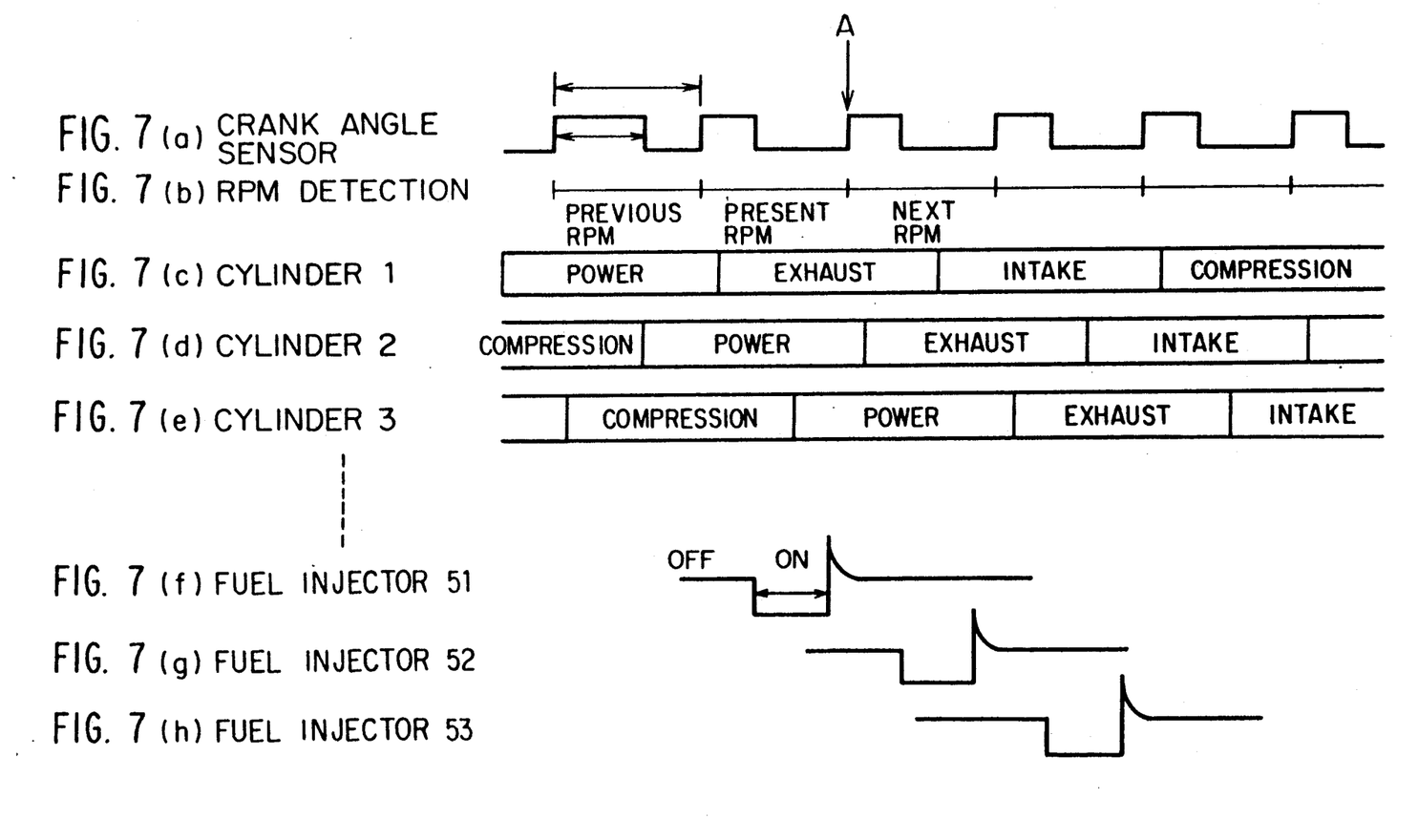
FIGS. 7(a)–7(j) taken together constitute a timing diagram showing the output of the crank angle sensor, the period for measuring the engine speed, and the drive signals for the fuel injectors as a function of time.

The misfiring detection which is performed in Steps S64–S66 will be in greater detail while referring to FIGS. 7(a)-7(h), which constitute a timing diagram. FIG. 7(a) shows the output of the crank angle sensor 11. FIG. 7(b) shows the period of time for which the engine rotational speed is measured. FIGS. 7(c)-7(e) illustrate the state in each of the first three cylinders. FIGS. 7(f)-7(h) show the drive pulses for the fuel injectors 51-53 for the first three cylinders. The interrupt handling routine is executed upon each rising edge of the output of the crank angle sensor 11. The arrow at A indicates the time of an interrupt request to the CPU 200 from the interrupt controller 202.

At time A, the present RPM (during the power stroke of cylinder #2) is compared with the previous RPM (during the power stroke for cylinder #1). If misfiring takes place during the power stroke of cylinder #2, the torque which is output by the engine will suddenly fall, so the present rotational speed at time A will be much less than the previous rotational speed. The change in rotational speed will therefore exceed the reference value, and the CPU 200 will determine that cylinder #2 is misfiring. The crank angle sensor 11, the rotation counter 201, and the CPU 200 thus constitute means for sensing a misfiring cylinder of the engine.

In this embodiment, the crank angle sensor 11 is constructed so that the output pulse which is generated when cylinder 1 is in its power stroke has a high level which is longer than for the other cylinders. Therefore, by using the pulse from the crank angle sensor 11 for cylinder #1 as a reference, it is possible to differentiate each of the cylinders, and it can be determined which cylinder is misfiring. In Step S46, a misfiring flag for the cylinder which is misfiring is set and stored in the RAM 206.

As shown in lines FIGS. 7(f)-7(h), each fuel injector is driven during the exhaust stroke of the corresponding cylinder. A fuel injector supplies fuel to a cylinder for the period of time marked ON in the figure.

Returning now to the flow chart of FIG. 6, in Step S67, a signal indicating the air intake rate is input from the analog input port 204. In Step S68, the basic fuel injection amount is calculated based on the engine rotational speed and the air intake rate. In Step S69, the fuel injection correction K, which was calculated in the main routine, is read from the RAM 206 and the basic fuel injection amount is corrected by the fuel injection correction K. In Step S70, it is checked whether the misfiring flag is set for the cylinder into which injection is to take place. If the misfiring flag is not set, then in Step S71, the corrected fuel injection amount is set in the counter 208, and the counter 208 generates an output pulse which is provided to the power amplifier 209 corresponding to this cylinder during the exhaust stroke of the cylinder, and the corresponding fuel injector supplies fuel to the cylinder. On the other hand, if the misfiring flag for the cylinder is set, then Step S71 is skipped and no fuel is supplied to the cylinder. In Step S72, a return to the main program is performed.

Thus, as in the first embodiment, when misfiring occurs, the supply of fuel to the misfiring cylinder is stopped while the other cylinders can continue to function normally. Accordingly, uncombusted fuel is prevented from reaching the catalytic converter, and the catalytic converter does not overheat.

In Steps S64 to S72 of FIG. 6, misfiring is detected by calculating the change in the rotational speed and comparing it with a reference value. However, it is also possible to detect misfiring by measuring the change in information corresponding to the rotational speed which is related to the inverse of the period. Alternatively, it is possible to detect misfiring by comparing the percent change in the rotational speed ([present rotational speed − previous rotational speed]/previous rotational speed) with a prescribed value.

Also, in the embodiment of FIG. 5, the rotational speed was measured between successive output pulses of the crank angle sensor 11, corresponding to 120 degrees of crankshaft rotation. However, if the rotational speed of the engine is calculated during a shorter period of time (such as from TDC to 30 degrees ATDC for each cylinder) during the power stroke when the generated torque is highest, the change in torque and rotational speed when misfiring occurs will be greater, so misfiring can be detected more accurately.

In the embodiment of FIG. 5, the fuel injector of a misfiring cylinder is prevented from operating by not setting a fuel injection amount in the corresponding counter 208. However, it is instead possible to equip the embodiment of FIG. 5 with amplifier switching circuits 210 and to switch the amplifier 209 of a misfiring cylinder off in the same manner as in the embodiment of FIG. 2.

The embodiment of FIG. 2 was explained for the case in which the fuel injectors are driven simultaneously, and the embodiment of FIG. 6 was explained for the case in which the fuel injectors are operated sequentially. However, the present invention can also be used to control fuel injectors so as to perform continuous or sequential injection, or so as to perform injection in groups.

What is claimed is:

1. A fuel controller for an internal combustion engine having a plurality of cylinders and a plurality of fuel injectors which supply fuel to the cylinders, comprising:

misfiring sensing means for sensing a misfiring cylinder of the engine, said misfiring sensing means comprising means for measuring the engine rotational speed during the power stroke of each cylinder, and means for determining when the rotational speed between successive power strokes for successive cylinders has fallen by more than a prescribed quantity; and fuel supply cut-off means for cutting off the supply of fuel to only the misfiring cylinder.

2. A fuel controller as claimed in claim 1, wherein said prescribed quantity is a prescribed rotational speed.

3. A fuel controller as claimed in claim 1, wherein said prescribed quantity is a prescribed percent of the rotational speed during the previous power stroke.

4. A fuel controller as claimed in claim 1, wherein said means for measuring the engine rotational speed comprises:

a crank angle sensor which generates pulses at prescribed crankshaft angles of the engine; and means for measuring the period between successive pulses of said crank angle sensor.

5. A fuel controller as claimed in claim 1, wherein said fuel supply cut-off means comprises:

a power amplifier for driving one of the fuel injectors; and a switching circuit which can turn said power amplifier on and off.

6. A fuel controller for an internal combustion engine having a plurality of cylinders and a fuel injector associated with each cylinder, comprising:

means for measuring the rotational speed of the engine between prescribed rotational angles of the engine;

means for sensing when a cylinder of the engine has misfired by determining when the measured rotational speed of the engine between prescribed rotational angles has changed by more than a prescribed quantity; and fuel supply cut-off means for cutting off the supply of fuel to a misfiring cylinder.

7. A fuel injection system for a multi-cylinder internal combustion engine comprising:

a plurality of fuel injectors, each of which is associated with a cylinder of the engine;

counter means for supplying a fuel injection pulse to each of said fuel injectors;

a plurality of power amplifiers, each of which is connected between said counter means and the fuel injector for a prescribed cylinder;

a plurality of switching circuits, each of which is connected to one of said power amplifiers and is capable of preventing the operation of the corresponding power amplifier;

means for sensing a misfiring cylinder comprising; means for measuring the engine rotational speed during the power stroke of each cylinder, and means for determining when the rotational speed between successive power strokes for successive cylinders has fallen by more than a prescribed quantity; and means for operating the switching circuit corresponding to only the misfiring cylinder to turn off the power amplifier for only the misfiring cylinder.

* * * * *